(No Model.)

J. L. PURINTON.
LAMP WICK TRIMMER.

No. 542,027. Patented July 2, 1895.

Witnesses
G. W. Stipek
Willie Eck

Inventor
John L. Purinton
By James Shepard
Atty.

UNITED STATES PATENT OFFICE.

JOHN L. PURINTON, OF HARTFORD, CONNECTICUT.

LAMP-WICK TRIMMER.

SPECIFICATION forming part of Letters Patent No. 542,027, dated July 2, 1895.

Application filed March 13, 1895. Serial No. 541,566. (No model.)

*To all whom it may concern:*

Be it known that I, JOHN L. PURINTON, a citizen of the United States, residing at Hartford, in the county of Hartford and State of Connecticut, have invented certain new and useful Improvements in Lamp-Wick Trimmers, of which the following is a specification.

My invention relates to improvements in lamp-wick trimmers, and the main object of my improvement is to provide a cheap, convenient, and efficient implement for trimming lamp-wicks and one that will insure of the wick being trimmed to proper form.

Figure 1:
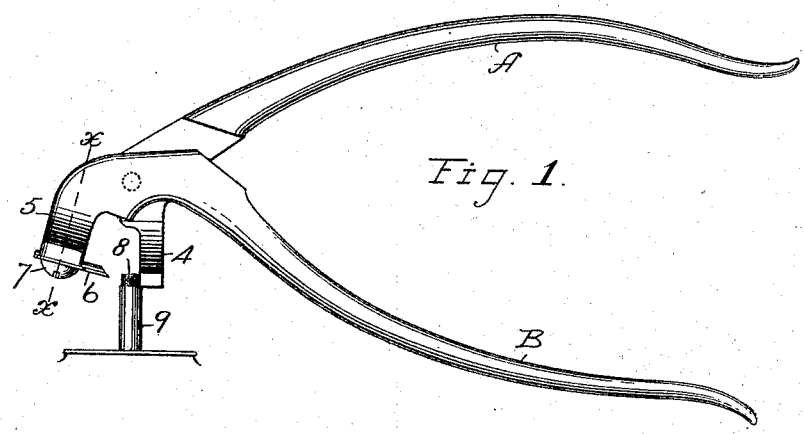
Figure 2:
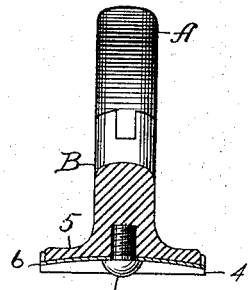
Figure 3:
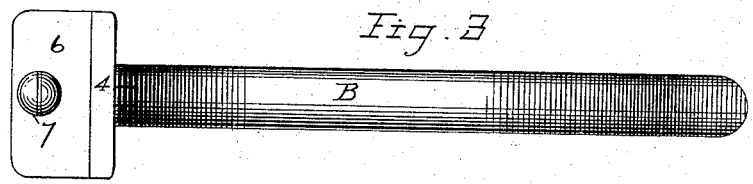

In the accompanying drawings, Figure 1 is a side elevation of my wick-trimmer, together with a wick-tube and wick, to illustrate the proper application of my implement thereto. Fig. 2 is a sectional view of the same on the line $x$ $x$ of Fig. 1, the implement being closed; and Fig. 3 is a reverse plan view of the same.

I employ two pivoted lever-handles A B, as in cutting-pliers, saw-sets, and analogous implements; but, unlike such implements, I employ depending jaws 4 5, that extend substantially at right angles to a line passing centrally between said handles in the direction of their length. The jaw 4 is on the lever-handle A and is straight across its end for a gaging-face, while that side which faces the companion jaw 5 is also flat and smooth and constitutes the bed-like cutting or resisting face for the cutter 6 to cut against. The end of the jaw 5, which jaw is a continuation of the lever-handle B, is concave, as shown in Fig. 2, and forms a seat for securing the cutter 6, which is of the same form in edge view. This cutter I secure to its seat preferably by a single screw 7, as shown, so that it may rock and bring its edge parallel to the resisting-face of the jaw 4, against which the edge of the cutter 6 is made to bear. The end of the jaw 4 should be parallel with a line extending from one side edge of the cutter 6 to its opposite side edge, as shown in Fig. 2.

In use the lamp-wick 8 is raised to the desired point above the end of the wick-tube 9 and the gaging-face of the jaw 4 placed on the top of the wick-tube by one side of the wick, as shown in Fig. 1. The handles are then forced together, bringing the cutter 6 against the resisting-face of the jaw 4 and neatly and cleanly cutting the wick to the shape of the cutter, thereby leaving its end convex, as viewed in side view, and preventing the corners from being so long as to give an ill-shaped flame. The wick is also properly gaged by the end face of the jaw 4 thus placed on the end of the wick-tube, so that the wick is not only the highest in the middle, but each corner is of the same height, because cutting with lateral pressure between parallel jaws has no tendency to force the wick edgewise to one side.

I claim as my invention—

1. The herein described lamp wick trimmer, consisting of the lever handles and jaws, one of which has a gaging face at its end extending transversely to the handle from side to side and a resisting face at one side, and the other jaw of which has the cutter for working against said resisting face, the edge of which cutter also extends transversely to the handle from side to side, whereby after raising the wick, the implement is adapted for use by placing the gaging face on the top end of the wick tube by one broad side of the wick, and holding it there while the handles are operated to cut the wick as described.

2. The herein described lamp wick trimmer consisting of the pivoted lever handles, one of which has a resisting face and a straight gaging face extending from side to side transversely to the handle, and the other of which has a concave end face and a cutter secured thereto on a single pivotal fastening, substantially as described and for the purpose specified.

JOHN L. PURINTON.

Witnesses:
O. M. BROWN,
MARY HALL.